United States Patent
Kim et al.

(10) Patent No.: US 10,063,945 B2
(45) Date of Patent: Aug. 28, 2018

(54) METHOD AND SYSTEM FOR SWITCHING PHOTONIC FRAME

(71) Applicant: ELECTRONICS AND TELECOMMUNICATIONS RESEARCH INSTITUTE, Daejeon (KR)

(72) Inventors: Yunjoo Kim, Seongnam-si (KR); YongWook Ra, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 56 days.

(21) Appl. No.: 15/417,344

(22) Filed: Jan. 27, 2017

(65) Prior Publication Data

US 2018/0084319 A1 Mar. 22, 2018

(30) Foreign Application Priority Data

Sep. 21, 2016 (KR) .................. 10-2016-0120512

(51) Int. Cl.
| | |
|---|---|
| *H04Q 11/00* | (2006.01) |
| *H04L 5/00* | (2006.01) |
| *H04L 7/00* | (2006.01) |
| *H04L 12/931* | (2013.01) |
| *H04L 12/947* | (2013.01) |

(52) U.S. Cl.
CPC ....... *H04Q 11/0005* (2013.01); *H04L 5/0055* (2013.01); *H04L 7/0075* (2013.01); *H04L 49/25* (2013.01); *H04L 49/357* (2013.01); *H04Q 2011/0045* (2013.01); *H04Q 2011/0086* (2013.01)

(58) Field of Classification Search
CPC ....... H04Q 11/0005; H04Q 2011/0045; H04Q 2011/0086; H04L 5/0055; H04L 7/0075; H04L 49/25; H04L 49/357
See application file for complete search history.

(56) References Cited

U.S. PATENT DOCUMENTS

| | | | |
|---|---|---|---|
| 9,282,384 B1 * | 3/2016 | Graves | H04Q 11/0005 |
| 9,794,657 B1 * | 10/2017 | Jiang | H04J 14/0212 |
| 2014/0334821 A1 * | 11/2014 | Mehrvar | H04Q 11/0005 398/54 |
| 2016/0226787 A1 * | 8/2016 | Kiaei | H04L 47/6255 |

FOREIGN PATENT DOCUMENTS

| | | |
|---|---|---|
| KR | 10-0198955 B1 | 6/1999 |
| KR | 10-1586950 B1 | 1/2016 |

OTHER PUBLICATIONS

Xiaoling Yang et al., "40Gb/s Pure Photonic Packet Switch for Datacenters", OFC 2015, OSA 2015.

* cited by examiner

*Primary Examiner* — Duc C Ho
(74) *Attorney, Agent, or Firm* — LRK Patent Law Firm

(57) ABSTRACT

A photonic frame switching method and system. The photonic frame switching method includes resetting, by a second input module receiving a master notification, a second timeslot counter used in the second input module to be synchronized with a first timeslot counter used in a first input module, and transmitting a photonic frame from each of a plurality of input modules to a photonic switch fabric device according to a timeslot allocated to each of the input modules based on a scheduling acknowledgement signal transmitted from a main controller, based on the synchronized first and second timeslot counters.

20 Claims, 11 Drawing Sheets

METHOD AND SYSTEM FOR SWITCHING PHOTONIC FRAME

CROSS-REFERENCE TO RELATED APPLICATION(S)

This application claims the priority benefit of Korean Patent Application No. 10-2016-0120512 filed on Sep. 21, 2016, in the Korean Intellectual Property Office, the disclosure of which is incorporated herein by reference for all purposes.

BACKGROUND

1. Field

One or more example embodiments relate to an effective frame transmitting technology for switching a photonic frame.

2. Description of Related Art

Most research studies on a network switch may focus on improvement of a throughput of an Internet protocol (IP) traffic and a delay time in order to solve an issue associated with a rapid increase in power consumption of a data center including an electrical switch and a router, an increase in a network delay time, an increase in a networking cost, and a constraint on expansion.

Due to a proliferation of multimedia services, a development of Internet of things (IoT) technology, and an increase in mobile services, data traffic has been increasing explosively and a capacity of a switch fabric, which is a core element of network equipment, has also been increasing rapidly.

In the data center on which packets converge, IP traffic is expected to reach several zettabytes and servers configured to provide services have been increasing explosively, and thus an ultrahigh-capacity network switch may be needed.

Thus, research has been conducted to switch an ultrahigh-capacity frame by establishing a data center based on photonic switching technology. However, in a process of resetting a path through a photonic switch fabric, an increased use of a memory to reduce a collision at an output port may generate a buffering constraint and increase a delay time.

Thus, for switching of an ultrahigh-capacity frame of tens or hundreds of terabytes, an effective and synchronized scheduling method may be needed to prevent a frame loss that may occur due to a collision at an output port.

SUMMARY

An aspect provides a method of synchronizing scheduled timeslots using timing information, or a timeslot counter, mutually used by a plurality of input modules, in switching performed by encapsulating, in a photonic frame, a packet input to each of the input modules through an exchange of scheduling information between a main controller and the input modules.

Another aspect also provides a method of transmitting, to remaining input modules, a master notification from a master input module among a plurality of input modules that receives first a scheduling acknowledgement signal from a main controller during a set time, for example, an interframe gap (IFG) time, a 96 bits time, notifying the remaining input modules of a start of a newly scheduled timeslot, initializing a timeslot counter in the remaining input modules receiving the master notification, and transmitting a photonic frame from each of the input modules based on an allocated timeslot, based on a synchronized timeslot counter.

Still another aspect also provides an effective synchronized scheduling method to prevent a frame loss that may occur due to a collision at an output port in a network switch configured to perform switching on an ultrahigh-capacity photonic frame of tens or hundreds of tera.

Yet another aspect also provides a method of effectively performing switching on a photonic frame generated using an input packet without a loss in a photonic switch fabric device, by performing the switching on the photonic frame using scheduling information exchanged between a main controller and an input module in response to an input of a packet through a plurality of input modules.

Further another aspect also provides a method of synchronizing scheduling acknowledgement signals to be transmitted from a main controller to a plurality of input modules in order to prevent a collision among photonic frames at an output port and a loss of the photonic frames that may occur due to a delay in transmission of the scheduling acknowledgement signals.

According to an aspect, there is provided a photonic frame switching method including transmitting a scheduling request from each of a plurality of input modules to a main controller, in response to reception of a first scheduling acknowledgement signal transmitted from the main controller to a first input module among the input modules through unicast transmission, transmitting a master notification from the first input module to a second input module, which is a remaining input module of the input modules excluding the first input module, resetting, by the second input module receiving the master notification, a second timeslot counter used in the second input module to be synchronized with a first timeslot counter used in the first input module, and transmitting a photonic frame from each of the input modules to a photonic switch fabric device according to a timeslot allocated to each of the input modules based on a scheduling acknowledgement signal transmitted from the main controller, based on the synchronized first and second timeslot counters.

According to another aspect, there is provided a photonic frame switching method including, in response to an input of at least one packet, transmitting a scheduling request from an input module to a main controller, in response to reception of a scheduling acknowledgement signal transmitted from the main controller as a response to the scheduling request, transmitting a master notification to another input module, in response to reception of the master notification by the other input module occurring before reception of the scheduling acknowledgement signal, resetting a timeslot counter to synchronize the reset timeslot counter with a timeslot counter used in the input module from which the master notification is transmitted, verifying a timeslot allocated to the input module from the scheduling acknowledgement signal received from the main controller, and transmitting a photonic frame generated using the at least one packet to a photonic switch fabric device during the verified timeslot corresponding to the timeslot counter synchronized with the timeslot counter used in the other input module.

According to still another aspect, there is provided a photonic frame switching system including a main controller, and a plurality of input modules each configured to transmit a scheduling request to the main controller. In response to reception of a first scheduling acknowledgement signal transmitted from the main controller through unicast transmission, a first input module among the input modules may transmit a master notification to a second input module, which is a remaining input module of the input modules excluding the first input module. The second input module receiving the master notification may reset a second timeslot counter used in the second input module to synchronize the reset second timeslot counter with a first timeslot counter used in the first input module. Each of the input modules may transmit a photonic frame to a photonic switch fabric device according to a timeslot allocated to each of the input modules based on a scheduling acknowledgement signal transmitted from the main controller, based on the synchronized first and second timeslot counters.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
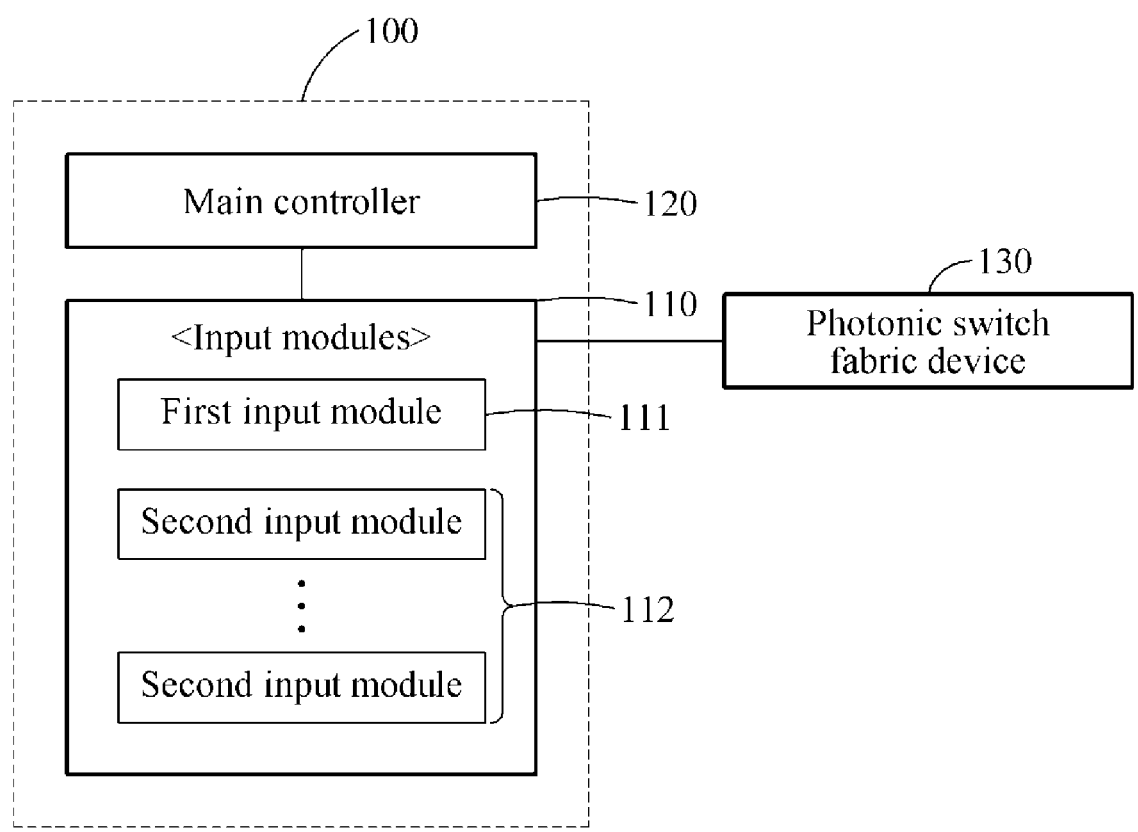
FIG. 1 is a diagram illustrating a configuration of a photonic frame switching system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a configuration of a photonic frame switching system according to an example embodiment.

Referring to FIG. 1, a photonic frame switching system 100 according to an example embodiment includes a plurality of input modules 110 and a main controller 120. According to an example embodiment, the photonic frame switching system 100 further includes a photonic switch fabric device 130.

In response to input of a packet, each of the input modules 110 may transmit a scheduling request to the main controller 120.

Figure 4:
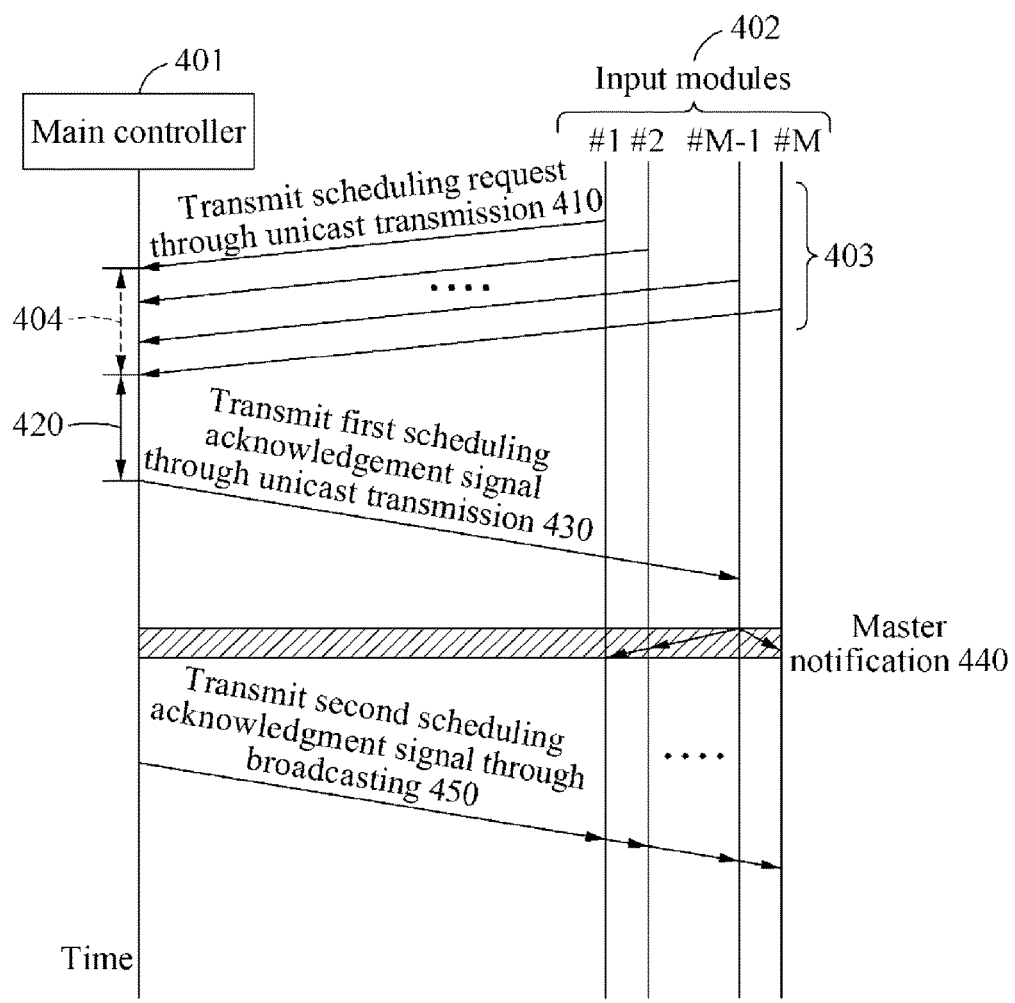
FIG. 4 is a diagram illustrating an example of a process of exchanging a scheduling request and a scheduling acknowledgement signal between a main controller and a plurality of input modules according to an example embodiment.
Figure 5:
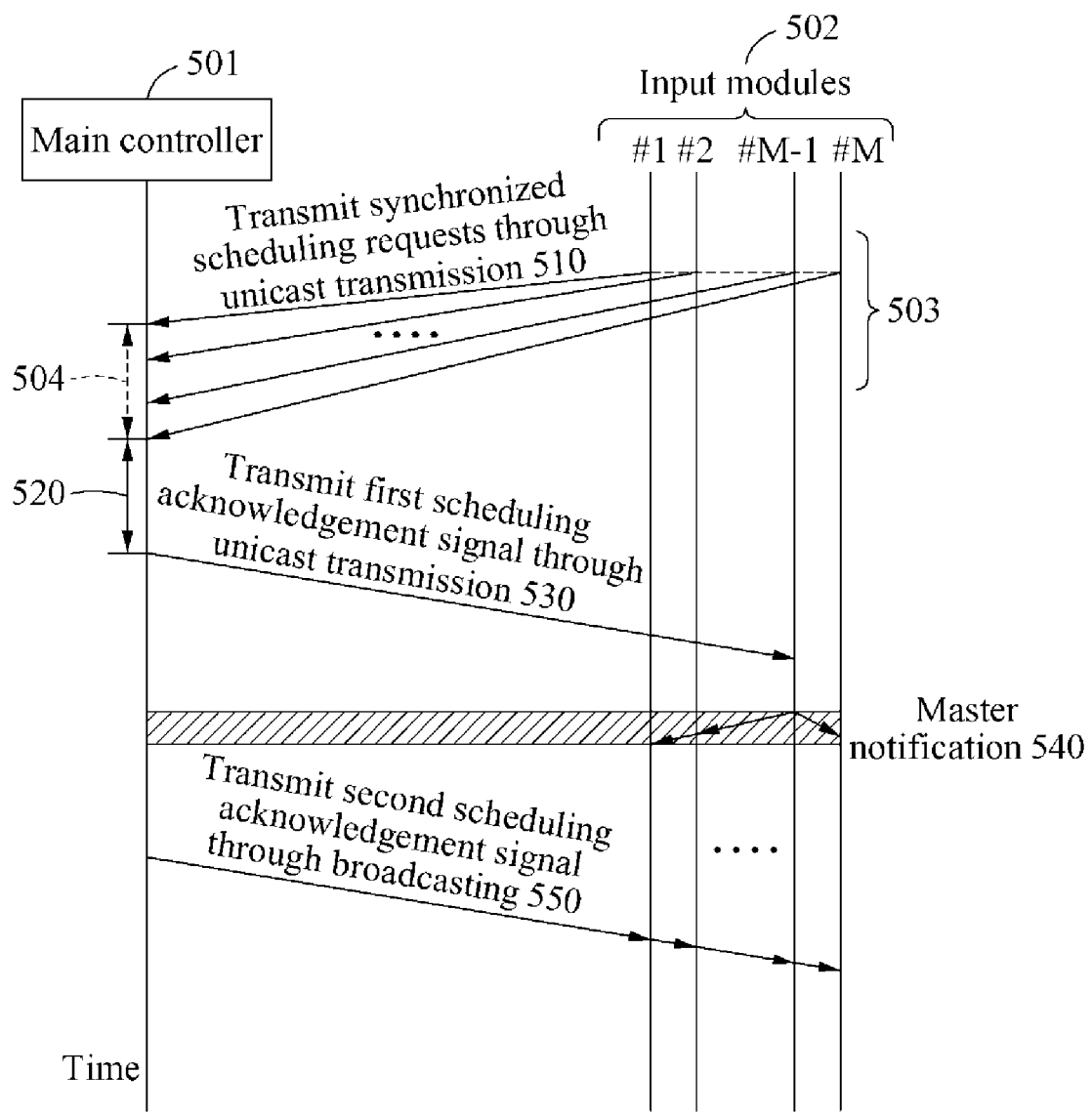
FIG. 5 is a diagram illustrating another example of a process of exchanging a scheduling request and a scheduling acknowledgement signal between a main controller and a plurality of input modules according to an example embodiment.

For example, each of the input modules 110 may transmit, to the main controller 120, a scheduling request generated by an input of a packet at an appropriate transmission time without synchronization as illustrated in 403 of FIG. 4, or through synchronization as illustrated in 503 of FIG. 5.

In such an example, due to a difference in transmission delay between each of the input modules 120 and the main controller 120 and a difference in process time of analyzing and classifying a scheduling request, scheduling requests may be sequentially received by the main controller 120 as illustrated in 404 of FIG. 4 and 504 of FIG. 5.

In response to the scheduling requests sequentially received from the input modules 110, the main controller 120 may perform scheduling during a predefined minimum scheduling time.

Each of the input modules 110 may include a synchronization controller configured to transmit the scheduling request through an input and output port included in each of the input modules 110 in response to the number of input packets being greater than or equal to a threshold value, and receive a first scheduling acknowledgement signal or a second scheduling acknowledgement signal from the main controller 120 through the input and output port as a response to the scheduling request.

In addition, each of the input modules 110 may include a packet controller configured to, in response to reception of the first scheduling acknowledgement signal or the second scheduling acknowledgement signal, transmit a photonic frame generated using the packet to the photonic switch fabric device 130.

Here, using the packet controller, each of the input modules 110 may generate a photonic frame including at least one of at least one subframe including a packet to be input to a corresponding input module, an identification value of the subframe, and a minimum distance between subframes.

For example, the packet controller may generate the photonic frame by changing a start frame delimiter (SFD) field in an Ethernet frame to a header, and adding an interframe gap (IFG) field including the minimum distance between subframes following a frame check sequence (FCS) field in the Ethernet frame.

The packet controller may also generate the photonic frame by applying various data transmission packets in addition to the Ethernet frame, based on an environment in which switching is performed on the photonic frame.

In response to reception of the first scheduling acknowledgement signal transmitted from the main controller 120 through unicast transmission, a first input module 111 among the input modules 110 may transmit a master notification to a second input module 112, which is a remaining input module of the input modules 110 excluding the first input module 111.

That is, the first input module 111 may transmit the master notification to the second input module 112 at a time interval set based on a point in time at which the first scheduling acknowledgement signal is transmitted from the main controller 120, and thus allow a first timeslot counter and a second timeslot counter to be synchronized with each other before the second scheduling acknowledgement signal is transmitted to the second input module 112 through broadcasting.

The second input module 112 receiving the master notification may reset the second timeslot counter used in the second input module 112 to be synchronized with the first timeslot counter used in the first input module 111.

The main controller 120 may receive the scheduling request from each of the input modules 110, and classify the input modules 110 into the first input module 111 and the second input module 112 from which the first input module 111 is excluded, based on a result of the scheduling performed in response to the scheduling request.

The main controller 120 may perform the scheduling in response to reception of the number of scheduling requests from the input modules 110 being greater than or equal to a preset number, or perform the scheduling in response to reception of scheduling requests received during a period of time from a point in time at which a scheduling request is initially received, or a first scheduling request is received.

The main controller 120 may transmit the first scheduling acknowledgement signal to the first input module 111 through unicast transmission, and transmit the second scheduling acknowledgement signal to the second input module 112 through broadcasting at the set time interval, for example, an IFG time, or a 96 bits time, after transmitting the first scheduling acknowledgement signal.

That is, when a predefined minimum scheduling time elapses, the main controller 120 may transmit the first scheduling acknowledgement signal to the first input module 111 through unicast transmission, and transmit the second scheduling acknowledgement signal to the second input module 112 through broadcasting at the set time interval after transmitting the first scheduling acknowledgement signal, based on the result of the scheduling performed in response to the scheduling request.

Although the time interval may vary depending on an example embodiment, the time interval may be an IFG time, for example, a 96 bits time, defined in Ethernet standards, in a case of a photonic frame including at least one subframe that is configured using an Ethernet frame.

In response to reception of the first scheduling acknowledgement signal, using the synchronization controller in the first input module 111, the first input module 111 may provide a notification to the second input module 112 that the first input module 111 is a master input module, and guide the second input module 112 to reset a timeslot counter.

In addition, using the packet controller in the first input module 111, the first input module 111 may verify a timeslot allocated to the first input module 111 from the first scheduling acknowledgement signal.

Each of the input modules 110 may transmit the generated photonic frame to the photonic switch fabric device 130 according to a timeslot allocated to each of the input modules 110 based on a scheduling acknowledgement signal transmitted from the main controller 120, for example, the first scheduling acknowledgement signal or the second acknowledgement signal, based on the synchronized first and second timeslot counters.

When the first timeslot counter corresponds to the verified timeslot, the first input module 111 may transmit the photonic frame generated by the first input module 111 to the photonic switch fabric device 130 through an input port in the photonic switch fabric device 130 corresponding to the first input module 111, during the timeslot being maintained.

Using the packet controller in the second input module 112, the second input module 112 may verify a timeslot allocated to the second input module 112 from the second scheduling acknowledgement signal. When the second timeslot counter mutually used by the input modules 110 corresponds to the verified timeslot, the second input module 112 may transmit the photonic frame generated by the second input module 112 to the photonic switch fabric device 130 through an input port in the photonic switch fabric device 130 corresponding to the second input module 112, during the timeslot being maintained.

When respective destinations of photonic frames transmitted from the input modules 110 are different, the photonic switch fabric device 130 may change a wavelength based on the timeslot allocated to each of the input modules 110 during a switching transmission time for which the timeslot is allocated, and switch the photonic frames to be transmitted to an outputter through different output ports of the photonic switch fabric device 130.

That is, the photonic switch fabric device 130 may perform a frequency division on the switching transmission time classified by a timeslot, and simultaneously transmit the photonic frames at various wavelengths.

Thus, according to an example embodiment, through an exchange of scheduling information between a main controller and a plurality of input modules, a packet to be input through the input modules may be effectively switched and transmitted based on the scheduling information.

In addition, a collision at an output port that may occur due to asynchronous scheduling information among the input modules may be reduced, and thus efficiency of use of a memory may be improved because an additional memory used to reduce the collision is not needed.

Further, when a packet to be externally output from a data center is input through the input modules, a high-throughput switching process with increased transmission efficiency may be supported by encapsulating each packet into a subframe and generating a photonic frame including subframes in an aggregated form.

Figure 2:
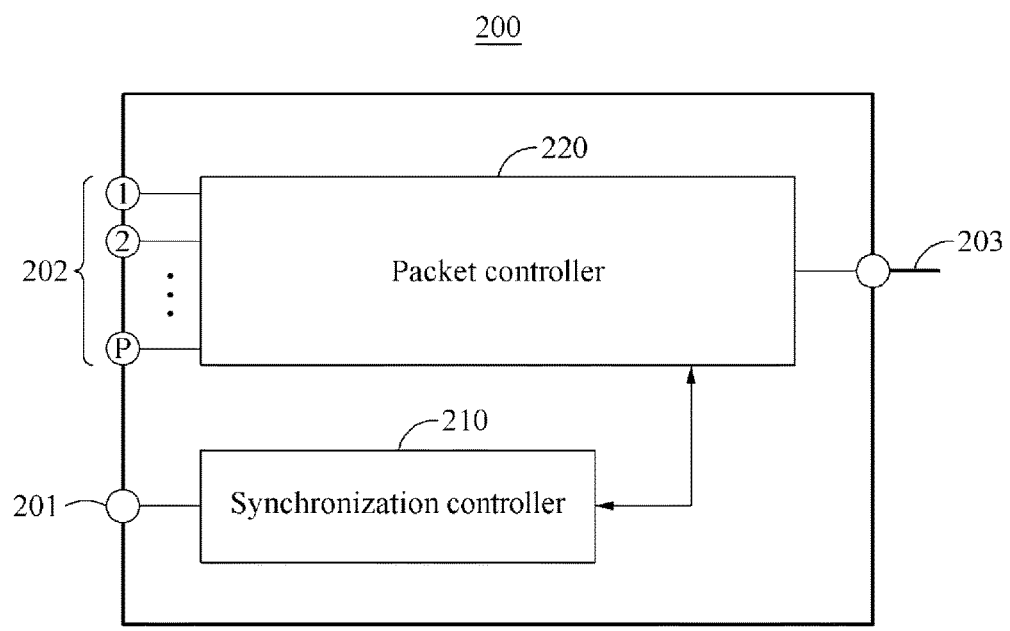
FIG. 2 is a diagram illustrating an internal configuration of an input module according to an example embodiment.

FIG. 2 is a diagram illustrating an internal configuration of an input module according to an example embodiment.

Referring to FIG. 2, each of a plurality of input modules 200 includes a synchronization controller 210 and a packet controller 220.

The synchronization controller 210 may transmit a scheduling request to a main controller in response to an input of at least one packet.

When a scheduling acknowledgement signal is received from the main controller as a response to the scheduling request, the synchronization controller 210 may transmit a master notification to another input module. When the master notification is received by the other input module before the scheduling acknowledgement signal is received, the synchronization controller 210 may reset a timeslot counter to be synchronized with a timeslot counter used in the other input module to which the master notification is transmitted.

The synchronization controller 210 may verify a timeslot allocated to each of the input modules 200 from the scheduling acknowledgement signal received from the main controller.

When the number of input packets is greater than or equal to a threshold value, the synchronization controller 210 may transmit the scheduling request through an input and output port 201 provided in each of the input modules 200, and receive the scheduling acknowledgement signal, for example, a first scheduling acknowledgement signal or a second scheduling acknowledgement signal, from the main controller through the input and output port 201.

In response to reception of the first scheduling acknowledgement signal, the synchronization controller 210 in a first input module of the input modules 200 by which the first scheduling acknowledgement signal is received may initialize or reset a timeslot counter, verify a timeslot allocated to the first input module, for example, timeslot #1, from the first scheduling acknowledgement signal, and transmit a master notification to a second input module of the input modules 200 from which the first input module is excluded.

In response to reception of the master notification, the synchronization controller 210 in the second input module may initialize or reset a timeslot counter, and initialize a timeslot allocated to the second input module, for example, timeslot #2. In addition, the synchronization controller 210 in the second input module may verify a timeslot to be allocated to the second input module, for example, timeslot #3, from the second scheduling acknowledgement signal received from the main controller.

The packet controller 220 may transmit a photonic frame generated using the at least one packet to a photonic switch fabric device, while a timeslot counter synchronized with a timeslot counter used in another input module among the input modules 200 is being corresponding to a verified timeslot.

For example, when at least one packet is input through a plurality of input ports 202 included in each of the input modules 200, the packet controller 220 may encapsulate each packet in a subframe, and generate a photonic frame including at least one subframe.

As described above, the packet controller 220 may configure the photonic frame in an aggregated form of the at least one subframe including the packet to increase efficiency in transmitting the packet to be externally output from a data center and support a high-throughput switching process in the photonic switch fabric device.

Figure 3:
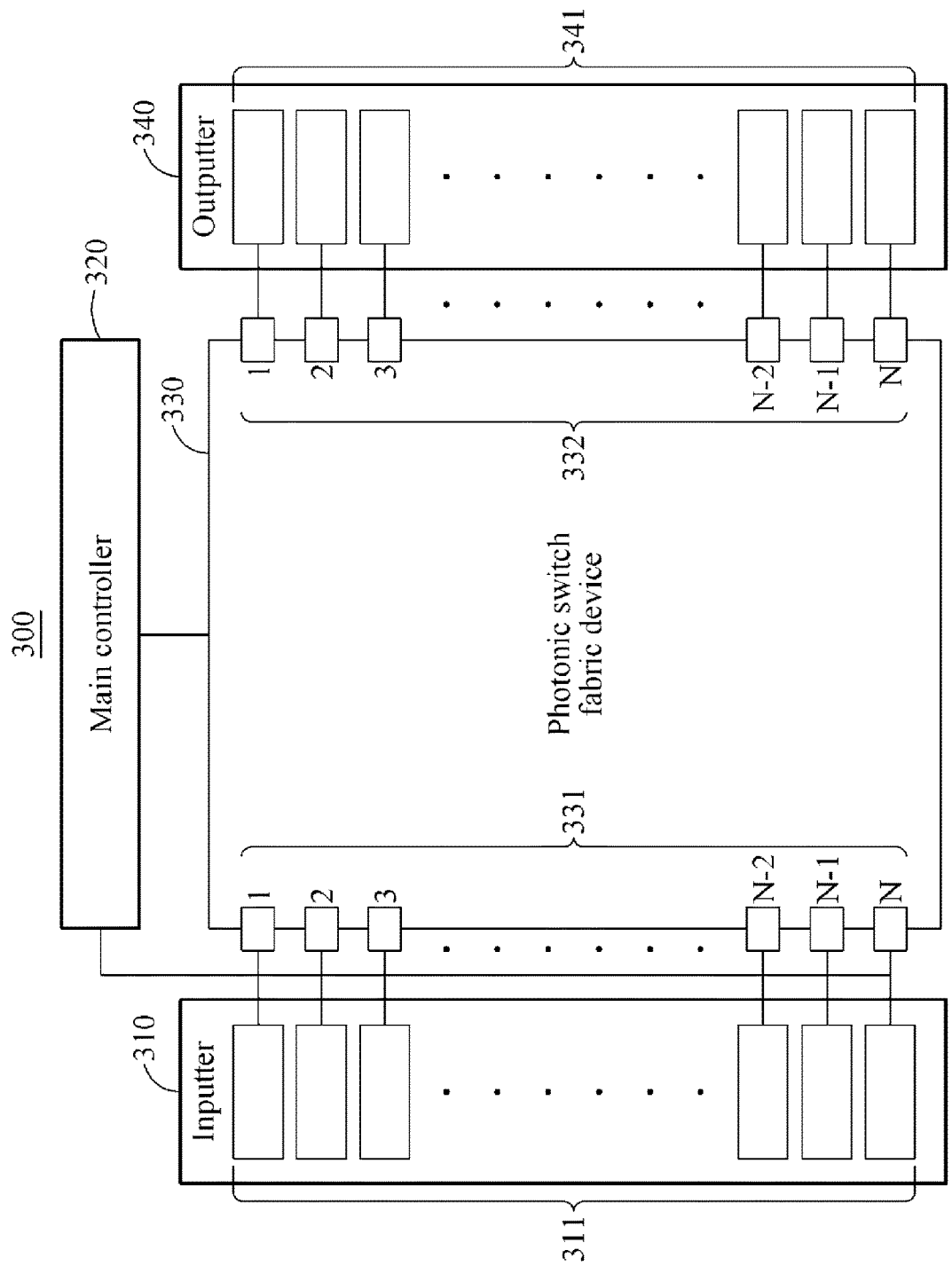
FIG. 3 a diagram illustrating a configuration of a photonic frame switching system according to another example embodiment.

In addition, the packet controller 220 may transmit the generated photonic frame to the photonic switch fabric device through an input port in the photonic switch fabric device, for example, input ports 331 of FIG. 3 corresponding respectively to the input modules 200, during a timeslot allocated in response to reception of the scheduling acknowledgement signal from the main controller.

Here, an input port in the photonic switch fabric device corresponding to the first input module may be designated by a packet input to the first input module, for example, a photonic frame to be transmitted.

That is, the packet controller 220 may transmit the generated photonic frame to the photonic switch fabric device by outputting the photonic frame to an output port 203 included in each of the input modules 200 and inputting the photonic frame to the input port in the photonic switch fabric device, during the allocated timeslot corresponding to the timeslot counter.

When performing switching on each of photonic frames transmitted from the input modules 200 to be transmitted to an outputter through different output ports of the photonic switch fabric device during a switching transmission time classified by a timeslot allocated to each of the input modules 200, the photonic switch fabric device may change a wavelength based on the timeslot, and thus may reduce a collision at the output ports.

That is, the packet controller 220 may determine a point in time at which the photonic frame is to be transmitted based on a timeslot counter that is mutually used by the input modules 200, and thus may readily prevent a collision among the photonic frames transmitted from the input modules 200, although the second scheduling acknowledgement signal is received by each second input module with a time difference due to a transmission delay.

FIG. 3 a diagram illustrating a configuration of a photonic frame switching system according to another example embodiment.

Referring to FIG. 3, a photonic frame switching system 300 according to another example embodiment includes an inputter 310, a main controller 320, a photonic switch fabric device 330, and an outputter 340.

The inputter 310 includes at least one input module 311, and may transmit a photonic frame generated by controlling a packet input to each of the input module 311 to the photonic switch fabric device 330 through a plurality of input ports 331 included in the photonic switch fabric device 330 based on scheduling information, for example, a timeslot, determined by an operation of the main controller 320.

The photonic switch fabric device 330 includes the input ports 331 and a plurality of output ports 332, and may switch the photonic frame transmitted from the inputter 310 through the input ports 331 to be transmitted to the output ports 332 and transfer the photonic frame to the outputter 340 including at least one output module 341.

The packet to be input to the inputter 310 may be decoded and recognized to be the photonic frame between the input module 311 and the output module 341, and thus the photonic frame switching system 300 may be applied to a data environment in which various forms of packets are used.

FIG. 4 is a diagram illustrating an example of a process of exchanging a scheduling request and a scheduling acknowledgement signal between a main controller and a plurality of input modules according to an example embodiment.

FIG. 4 illustrates an example of an exchange of a scheduling request and a response signal, for example, a scheduling acknowledgement signal, between a main controller 401 and a plurality of input modules 402.

Referring to FIG. 4, in stage 410, in response to an input of a packet, each of the input modules 402 transmits a scheduling request to the main controller 401 through unicast transmission.

For example, in response to the number of input packets being greater than or equal to a predefined threshold value T, a synchronization controller in each of the input modules 402 may transmit a scheduling request, for example, a request signal, to the main controller 401 using an input and output port included in each of the input modules 402, for example, the input and output port 201 of FIG. 2.

As illustrated in 403, the input modules 402 transmit, to the main controller 401, respective scheduling requests without synchronization at appropriate transmission times, and thus the scheduling requests may be sequentially received as illustrated in 404.

In stage 420, the main controller 401 performs scheduling in response to reception of the number of scheduling requests being greater than or equal to a preset number I from the input modules 402, or performs scheduling in response to scheduling requests received from the input modules 402 during a preset time from a point in time at which a scheduling request is initially received.

In stage 430, after a predefined minimum scheduling time S, the main controller 401 transmits a first scheduling acknowledgement signal to a first input module #M−1 through unicast transmission.

Here, the first input module #M−1 may be a master input module that is randomly determined among the input modules 402, and a first timeslot #1 may be allocated to the first input module #M−1.

In stage 440, in response to reception of the first scheduling acknowledgement signal from the main controller 401, the first input module #M−1 resets or initializes a timeslot counter, and notifies a remaining second input module of the input modules 402 excluding the first input module #M−1 that the first input module #M−1 is the master input module and notifies the second input module of a start of a newly scheduled timeslot. In addition, the first input module #M−1 verifies a timeslot allocated to the first input module #M−1 from the first scheduling acknowledgement signal.

In stage 450, when a preset time elapses after a point in time of the unicast transmission of the first scheduling acknowledgement signal, the main controller 401 transmits a second scheduling acknowledgement signal to each of the second input module through broadcasting.

Here, the time may be differently set depending on an example embodiment, and may be set to be an IFG time, for example, a 96 bits time, defined in an Ethernet standard in a case that a subframe in a photonic frame is configured using an Ethernet frame.

Here, the first scheduling acknowledgement signal refers to a signal to be transmitted to the first input module, which is the master input module, through unicast transmission. The second scheduling acknowledgement signal refers to a signal to be transmitted to the remaining input module excluding the first input module through broadcasting. Although the first scheduling acknowledgement signal and the second scheduling acknowledgement signal are different in terms of a transmission target and a transmission time, the first scheduling acknowledgement signal and the second scheduling acknowledgement signal may be identical.

In response to reception of a master notification, each of the second input module may reset or initialize a timeslot counter, and verify a timeslot newly allocated to each of the second input module from the second scheduling acknowledgement signal transmitted from the main controller 401 through broadcasting.

A single master input module, for example, a single first input module, is illustrated herein. However, in a case that the inputter 310 illustrated in FIG. 3 is configured as at least two sub-inputters each including a plurality of input modules, a master input module (for example, a first input module) may be determined for each of the sub-inputters, and each master input module may transmit a master notification to a second input module in a sub-inputter to which each master input module belongs so that each second input module may not receive a repeated master notification.

FIG. 5 is a diagram illustrating another example of a process of exchanging a scheduling request and a scheduling acknowledgement signal between a main controller and a plurality of input modules according to an example embodiment.

FIG. 5 illustrates an example of transmission of scheduling requests generated in a plurality of input modules 502 based on synchronized transmission timings of the scheduling requests.

Referring to FIG. 5, in stage 510, in response to an input of a packet, each of the input modules 502 transmits a scheduling request to a main controller 501 through unicast transmission.

Dissimilar to the example illustrated in FIG. 4 using appropriate transmission times of scheduling requests without synchronization, the input modules 502 transmit respective scheduling requests as illustrated in 503 by synchronizing transmission times of the scheduling requests to be periodically occurring transmission times using a time signal, for example, a timeslot counter, that is used mutually by all the input modules 502.

However, due to a difference in transmission delay between each of the input modules 502 and the main controller 501 and a difference in processing time for analyzing and classifying the scheduling requests by the main controller 501, the scheduling requests may be sequentially received as illustrated in 504, similarly to the example illustrated in FIG. 4.

In stage 520, the main controller 501 performs scheduling in response to reception of the number of scheduling requests being greater than or equal to a preset number I from the input modules 502, or performs scheduling in response to request schedules received from the input modules 502 during a preset time from a point in time at which a scheduling request is initially received.

In stage 530, after a predefined minimum scheduling time S, the main controller 501 transmits a first scheduling acknowledgment signal to a first input module #M−1 through unicast transmission.

Here, the first input module #M−1 may be a master input module randomly determined among the input modules 502, and a first timeslot #1 may be allocated to the first input module #M−1.

In stage 540, in response to reception of the first scheduling acknowledgement signal from the main controller 501, the first input module #M−1 resets or initializes a timeslot counter, and notifies a second input module, which is a remaining input module of the input modules 502 excluding the first input module #M−1, that the first input module #M−1 is the master input module and notifies the second input module of a start of a newly scheduled timeslot. In addition, the first input module #M−1 verifies a timeslot allocated to the first input module #M−1 from the first scheduling acknowledgement signal.

In stage 550, when a set IFG time elapses after a point in time of the unicast transmission of the first scheduling acknowledgement signal, the main controller 501 transmits a second scheduling acknowledgement signal to each of the second input module through broadcasting.

Figure 6:
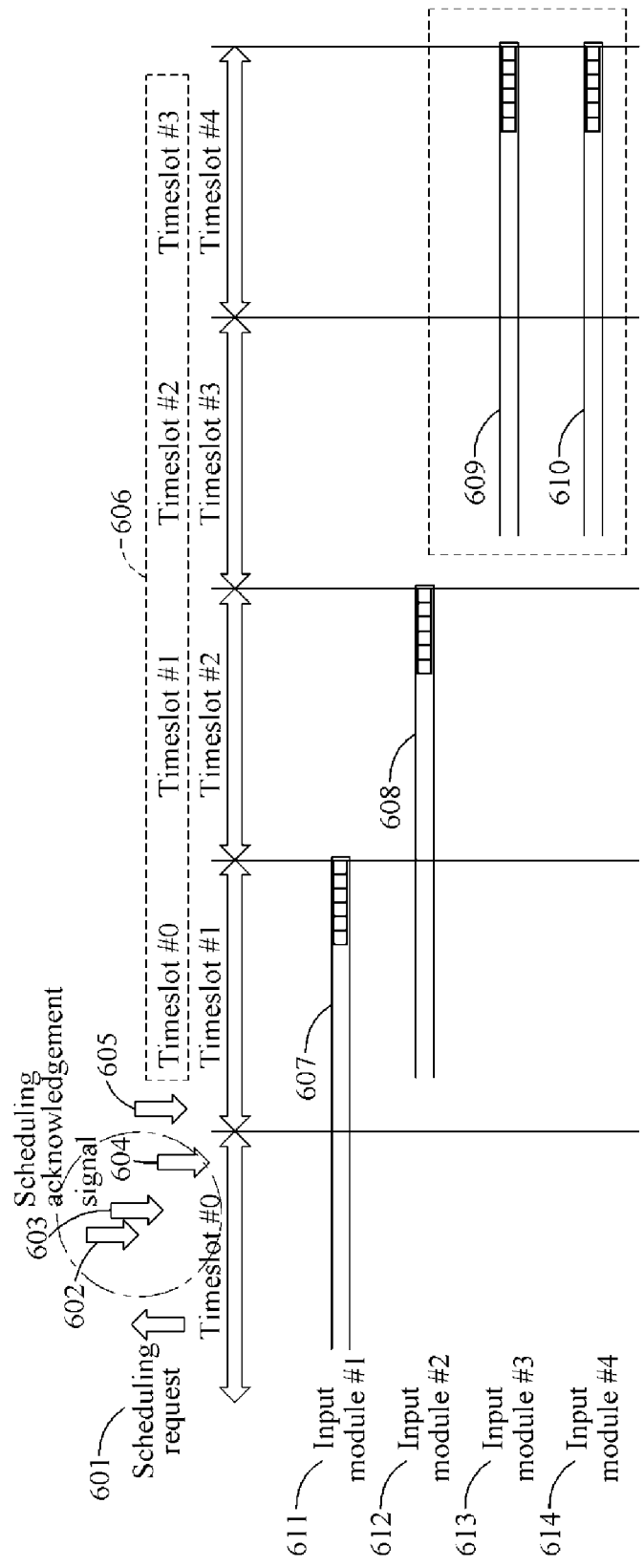
FIG. 6 is a diagram illustrating an example of a process of synchronizing timeslots allocated respectively to a plurality of input modules to prevent a collision among photonic frames according to an example embodiment.

FIG. 6 is a diagram illustrating an example of a process of synchronizing timeslots allocated respectively to a plurality of input modules to prevent a collision among photonic frames according to an example embodiment.

Referring to FIG. 6, to reduce a collision between photonic frames at an output port, for example, a collision between a photonic frame 609 and a photonic frame 610, that may occur due to asynchronous timeslots of a scheduling acknowledgement signal to be received by a plurality of input modules, for example, input module #1 611, input module #2 612, input module #3 613, and input module #4 614, a photonic frame switching system according to an example embodiment may synchronize scheduled timeslots using timing information, also referred to herein as a timeslot counter, that is used mutually by the input modules 611, 612, 613, and 614.

Each of the input modules 611, 612, 613, and 614 may generate a scheduling request 601 in response to an input of at least one packet, and a main controller may classify the first input module #1 611 as a first input module 611, and the remaining input modules #2 612, #3 613, and #4 614 as second input modules 612, 613, and 614 based on a result of scheduling performed in response to a scheduling request 601 received from the input modules 611, 612, 613, and 614.

The main controller may transmit a first scheduling acknowledgement signal 602 to the first input module 611 through unicast transmission. After a preset time interval, the main controller may transmit second scheduling acknowledgement signals, for example, a second scheduling acknowledgement signal 603, a second scheduling acknowledgement signal 604, and a second scheduling acknowledgement signal 605, to the second input modules 612, 613, and 614 from which the first input module 611 is excluded, through broadcasting.

Here, due to a transmission delay that may occur in a signal transfer process, the second scheduling acknowledgement signals 603, 604, and 605 broadcasted from the main controller to the second input modules 612, 613, and 614 may be received by the second input modules 612, 613, and 614 at different times. Thus, dissimilar to the other second scheduling acknowledgment signals 603 and 604, the second scheduling acknowledgement signal 605 may be received late by the second input module 613 after a timeslot is changed.

In such a case, the second input module 613 may misrecognize, as timeslot #0, timeslot #1 in which the second scheduling acknowledgement signal 605 is received. Thus, as illustrated in 606, the second input module 613 may misrecognize timeslots as being at a position mismatching one-by-one with a position recognized by the other input modules 611, 612, and 614.

Thus, although a timeslot allocated to the second input module 613 is timeslot #3, the second input module 613 may actually transmit the photonic frame 609 in timeslot #4, and thus the photonic frame 609 and the photonic frame 610 transmitted by the second input module 614 to which timeslot #4 is allocated may collide in a photonic switch fabric device.

To solve such a collision issue, the first input module 611 receiving the first scheduling acknowledgement signal 602 may reset or initialize a timeslot counter to be timeslot #0, verify timeslot #1 allocated to the first input module 611 from the first scheduling acknowledgement signal 602, and transmit a master notification.

The second input modules 612, 613, and 614 receiving the master notification may also reset or initialize a timeslot counter to be timeslot #0 identically to the first input module 611, and verify timeslot #2, timeslot #3, and timeslot #4 allocated respectively to the second input modules 612, 613, and 614 from the second scheduling acknowledgement signals 603, 604, and 605.

Thus, the first input module 611 may notify the second input modules 612, 613, and 614 of a start of a newly scheduled timeslot through the master notification, and thus a timeslot counter that is mutually used by all the input modules 611, 612, 613, and 614 may be initialized.

In the example illustrated in FIG. 6, the timeslot counter reset or initialized to be timeslot #0 may increase or change in order starting from timeslot #1, timeslot #2, timeslot #3, and timeslot #4 on a regular period.

Each of the input modules 611, 612, 613, and 614 may verify whether a timeslot allocated to each of the input modules 611, 612, 613, and 614 corresponds to a current timeslot counter, and transmit a photonic frame generated using an input packet, for example, a photonic frame 607, a photonic frame 608, the photonic frame 609, and the photonic frame 610, while the timeslot, for example, the timeslot allocated to each of the input modules 611, 612, 613, and 614, is being maintained.

That is, when the timeslot counter increases or changes, from timeslot #0 to timeslot #1, the first input module 611 may transmit the photonic frame 607 because the timeslot #1 allocated to the first input module 611 corresponds to the current timeslot counter, and the second input modules 612, 613, and 614 may wait without transmitting the photonic frames 608, 609, and 610 because the current timeslot counter does not correspond to timeslot #2, timeslot #3, and timeslot #4 allocated respectively to the second input modules 612, 613, and 614.

Afterward, when the timeslot counter increases or changes to timeslot #2, the second input module 612 may transmit the photonic frame 608 because timeslot #2 allocated to the second input module 612 corresponds to the current timeslot counter, and the remaining second input modules 613 and 614 may wait without transmitting the photonic frames 609 and 610.

That is, the photonic frame switching system may synchronize timeslots in which the input modules 611, 612, 613, and 614 transmit the photonic frames 607, 608, 609, and 610, respectively, based on a timeslot counter that is mutually used by all the input modules 611, 612, 613, and 614, and thus a collision among phonic frames using a same output port in the photonic switch fabric device may be readily prevented.

Thus, the photonic frame switching system may reduce a collision among photonic frames at an output port that may occur due to asynchronous timeslots of input modules, for example, the input modules 611, 612, 613, and 614 of FIG. 6, and also improve efficiency in using a memory because an additional memory is not needed to reduce the collision.

Figure 7:
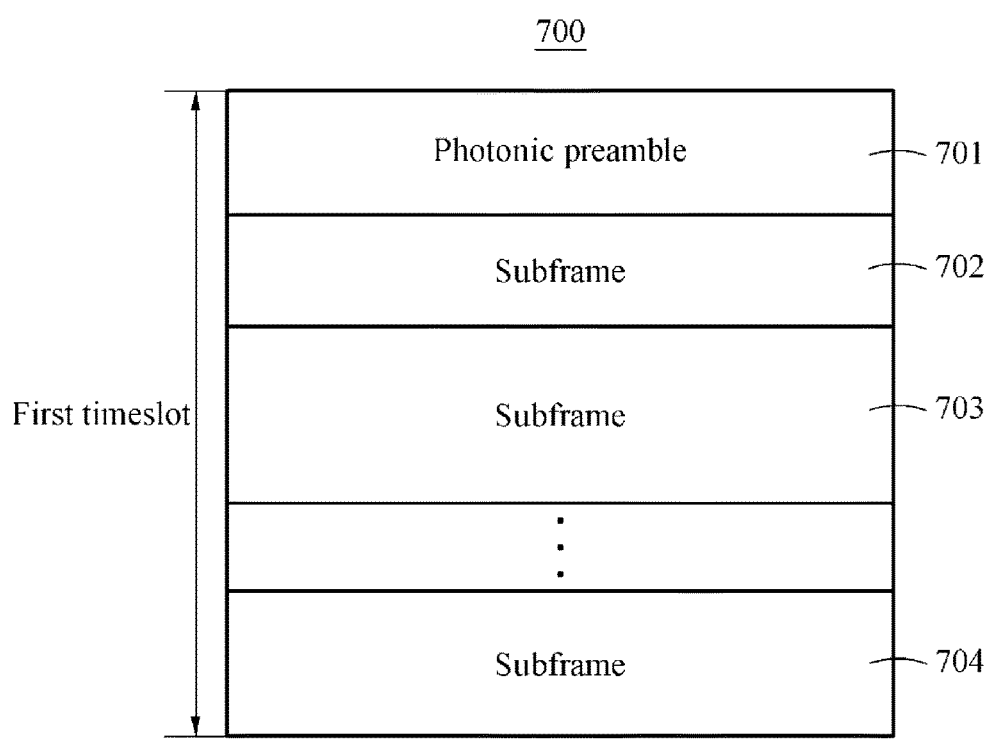
FIG. 7 is a diagram illustrating a structure of a photonic frame including at least one subframe according to an example embodiment.

FIG. 7 is a diagram illustrating a structure of a photonic frame including at least one subframe according to an example embodiment.

Each of a plurality of input modules in a photonic frame switching system may encapsulate each packet to be input to a corresponding input module into subframes, for example, subframes 702 through 704, and generate a photonic frame 700 in an aggregated form of the subframes 702 through 704.

Referring to FIG. 7, the photonic frame 700 includes a photonic preamble 701, and at least one subframe, for example, the subframes 702 through 704. A detailed structure of each of the subframes 702 through 704 is illustrated in FIG. 8.

A length of the photonic frame 700 may be a length of a single timeslot defined by a basic transmission unit. Although the photonic frame 700 may have a variable length, an example of generating the photonic frame 700 using an Ethernet transmission frame having a fixed length may be provided herein.

By configuring the photonic frame 700 to be in an aggregated form of the subframes 702 through 704 including a packet, efficiency in transmitting a packet to be externally output from a data center may be increased, and also a high-throughput switching process in a photonic switch fabric device may be supported.

Figure 8:
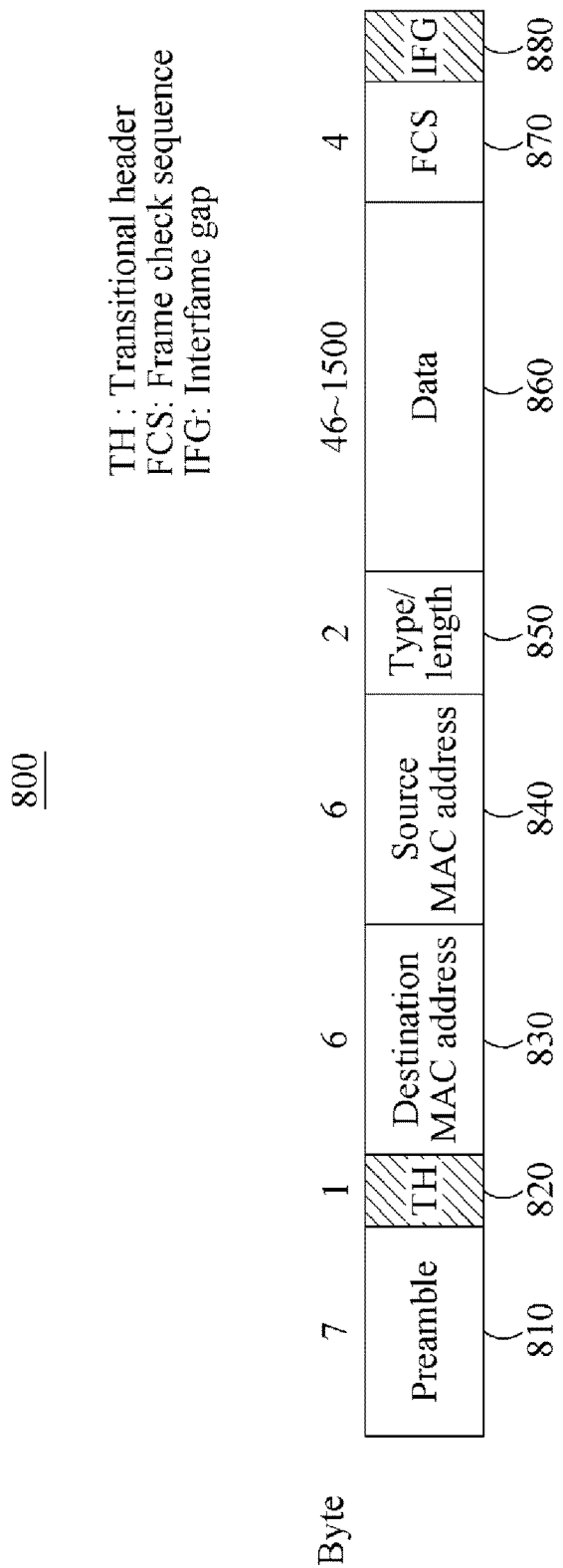
FIG. 8 is a diagram illustrating a structure of a subframe configured by using an Ethernet frame according to an example embodiment.

FIG. 8 is a diagram illustrating a structure of a subframe configured by using an Ethernet frame according to an example embodiment.

Referring to FIG. 8, a subframe 800 includes a preamble 810, a transitional header (TH) 820, a destination media access control (MAC) address 830, a source MAC address 840, a type/length 850, data 860, a frame check sequence (FCS) field 870, and an IFG field 880.

Each of a plurality of input modules may configure the subframe 800 including, as the data 860, each packet input to a corresponding input module.

In addition, the input modules may configure the subframe 800 as illustrated in FIG. 8 by changing an existing Ethernet frame.

In detail, the input modules may configure the subframe 800 by changing a start frame delimiter (SFD) field to the TH 820 including an identification value of the subframe 800.

In addition, the input modules may configure the subframe 800 by adding the IFG field 880 including a minimum distance between subframes, subsequent to the FCS field 870.

As described, the input modules may generate a photonic frame in an aggregated form of at least one subframe including a packet input to a corresponding input module.

Figure 9A:
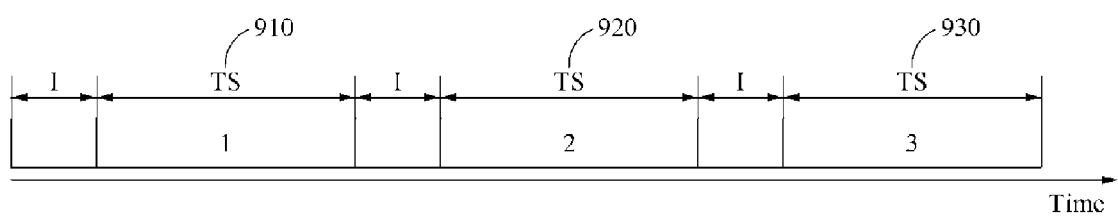
FIGS. 9A and 9B are diagrams illustrating an example of a process of performing a switching operation by a photonic switch fabric device during a switching transmission time classified by a timeslot according to an example embodiment.
Figure 9B:
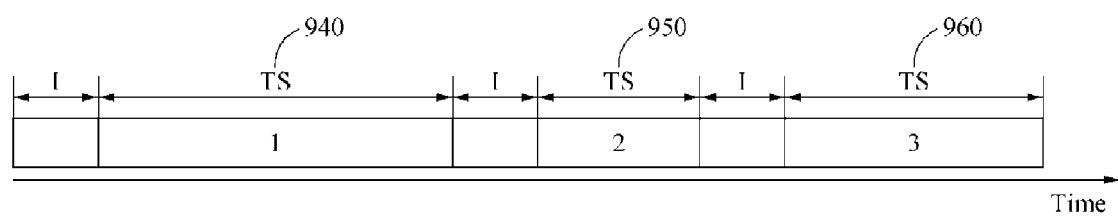

FIGS. 9A and 9B are diagrams illustrating an example of a process of performing a switching operation by a photonic switch fabric device during a switching transmission time classified by a timeslot according to an example embodiment.

FIGS. 9A and 9B illustrate an example of switching a photonic frame including packets with different destinations in a photonic switch fabric device, for example, the photonic switch fabric device 330 of FIG. 3, to be transmitted to an outputter, for example, the outputter 340 of FIG. 3. In such an example, the photonic frame switch fabric device may perform the switching on each photonic frame by changing a wavelength based on each of timeslots that is defined by a basic transmission unit, for example, TS1, TS2, and TS3.

Referring to FIG. 9A, the photonic switch fabric device may performing switching on a photonic frame including packets with different output ports during a switching transmission time, for example, a switching transmission time 910, a switching transmission time 920, and a switching transmission time 930, that is classified by timeslots TS1, TS2, and TS3 having a fixed length. Here, the timeslots TS1, TS2, and TS3 may have an inter-timeslot I thereamong, in which the inter-timeslot I is greater than or equal to 0 and less than or equal to TS ($0 \leq I \leq TS$).

As described with reference to FIG. 7, a length of a photonic frame may be a length of a single timeslot TS that is defined by a basic transmission unit, and the photonic frame may have a variable length. In a case of a photonic frame generated using an Ethernet frame may have a fixed length.

As illustrated in FIG. 9A, in a case that a photonic frame having a fixed length is generated and lengths of the timeslots TS1, TS2, and TS3 are equal, the photonic switch fabric device may perform the switching on the photonic frame during each of the switching transmission times 910, 920, and 930 that are identically fixed.

Referring to FIG. 9B, the photonic switch fabric device may perform switching on a photonic frame including packets with different output ports during a switching transmission time, for example, a switching transmission time 940, a switching transmission time 950, and a switching transmission time 960, that is classified by timeslots TS1, TS2, and TS3 having variable lengths.

As illustrated in FIG. 9B, in a case that a photonic frame having a fixed length is generated and lengths of the timeslots TS1, TS2, and TS3 are different, the photonic switch fabric device may perform the switching on the photonic frame during each of the switching transmission times 940, 950, and 960 that is changed for each photonic frame.

As described in the foregoing, the photonic switch fabric device may transmit a photonic frame at various wavelengths at a same time, by changing a wavelength through a frequency division performed on each of the switching transmission times 910 through 960 classified by the timeslots, based on a destination, or an output port, for which a packet heads again.

Hereinafter, a flow of operations of a photonic frame switching system, for example, the photonic frame switching system 100 of FIG. 1, will be described in detail with reference to FIG. 10.

Figure 10:
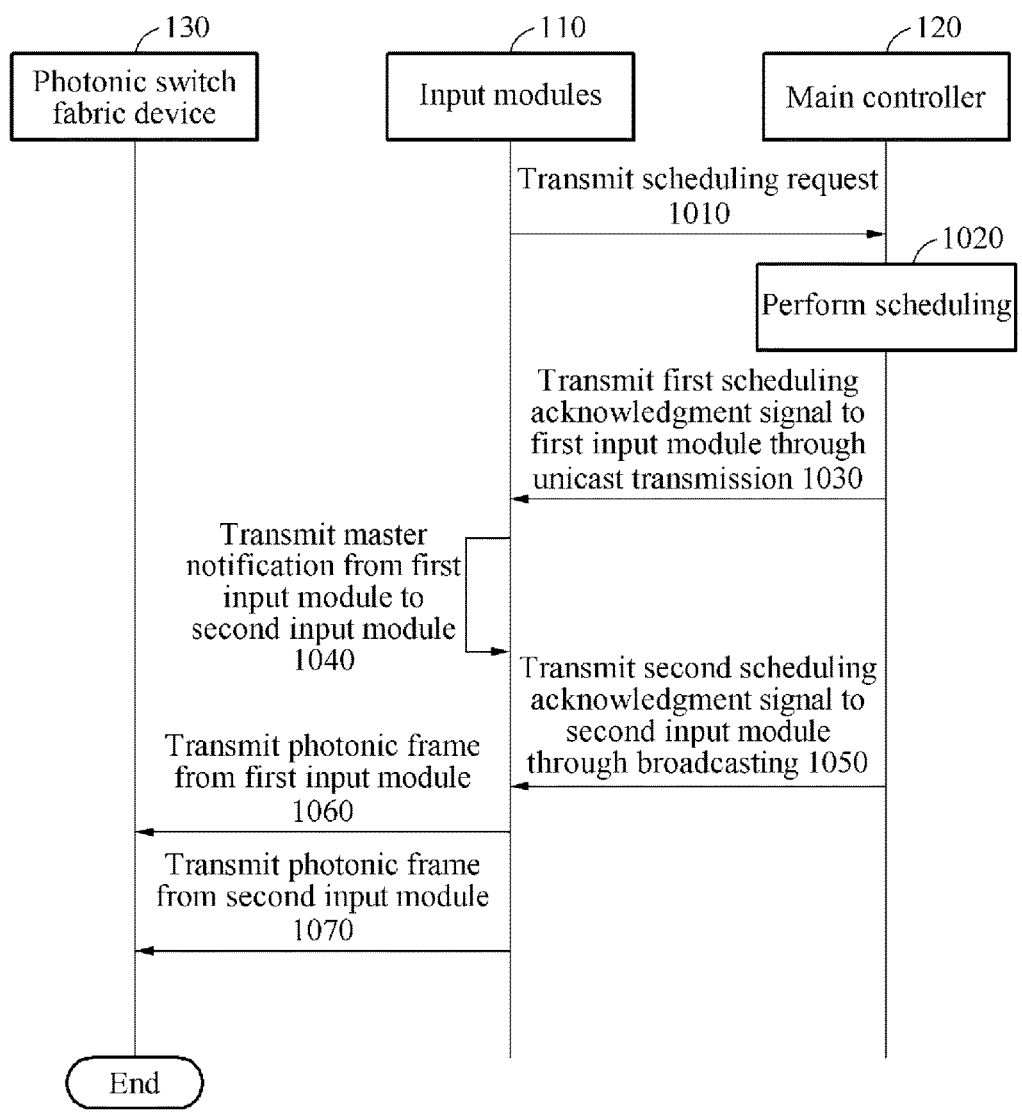
FIG. 10 is a diagram illustrating a flow of a photonic frame switching method according to an example embodiment.

FIG. 10 is a diagram illustrating a flow of a photonic frame switching method according to an example embodiment.

The photonic frame switching method according to an example embodiment may be performed by the photonic frame switching system 100 described with reference to FIG. 1.

Referring to FIG. 10, in operation 1010, an input module, for example, each of the input modules 110 of FIG. 1, transmits a scheduling request in response to an input of a packet.

When the number of input packs is greater than or equal to a threshold value, each of the input modules 110 may transmit the scheduling request through an input and output port included therein, and receive a first scheduling acknowledgement signal or a second scheduling acknowledgement signal as a response to the scheduling request from a main controller, for example, the main controller 120 of FIG. 1, through the input and output port.

In operation 1020, when the number of scheduling requests greater than or equal to a preset number is received from the input modules 110, the main controller 120 performs scheduling.

Alternatively, the main controller 120 may perform the scheduling only with scheduling requests received during a preset time from a point in time at which a first scheduling request is received, or a scheduling request is initially received.

For example, the main controller 120 may classify the input modules 110 into a first input module, for example, the first input module 111 of FIG. 1, and a remaining second input module excluding the first input module 111, for example, the second input module 112 of FIG. 1, based on a result of the scheduling performed in response to the scheduling request.

In operation 1030, after a predefined minimum scheduling time S, the main controller 120 transmits the first scheduling acknowledgement signal to the first input module 111 through unicast transmission. In operation 1040, the first input module 111 receiving the first scheduling acknowledgement signal transmits a master notification to the second input module 112. In operation 1050, the main controller 120 transmits the second scheduling acknowledgment signal to the second input module 112 through broadcasting, at a set time interval after transmitting the first scheduling acknowledgment signal.

Here, the time interval may vary depending on an example embodiment. However, in a case of a photonic frame including at least one subframe configured using an Ethernet frame, the time interval may be an IFG time, for example, a 96 bits time, which is defined in an Ethernet standard.

When the first input module 111 receives the first scheduling acknowledgment signal, the first input module 111 may notify the second input module 112 that the first input module 111 is a master input module, and guide the second input module 112 to reset a timeslot counter, and thus a timeslot counter that is mutually used in all the input modules 110 may be initialized.

That is, the input modules 110 may synchronize respective timeslots in which photonic frames are transmitted from the input modules 110, based on the timeslot counter mutually used in all the input modules 110. Thus, a collision among the photonic frames using a same output port in a photonic switch fabric device, for example, the photonic switch fabric device 130 of FIG. 1, may be prevented, and an additional memory used for solving such a collision may not be needed and efficiency in using a memory may be improved.

In operation 1060, the first input module 111 receiving the first scheduling acknowledgement signal verifies a timeslot allocated to the first input module 111 from the first scheduling acknowledgement signal, and transmits a photonic frame generated by the first input module 111 to the photonic switch fabric device 130 through an input port in the photonic switch fabric device 130 corresponding to the first input module 111 during the timeslot being maintained.

Here, using a packet controller, each of the input modules 110 may generate a photonic frame including at least one of at least one subframe including a packet input to a corresponding input module, an identification value of the subframe, and a minimum distance between subframes.

For example, the packet controller may generate the photonic frame by changing an SFD field in an Ethernet frame to a header including the identification value of the subframe, and adding an IFG field including the minimum distance between subframes subsequent to an FCS field in the Ethernet frame.

By configuring the photonic frame in an aggregated form of the at least one subframe including an input packet by each of the input modules 110, efficiency in transmitting a packet to be externally output from a data center may be increased and a high-throughput switching process in the photonic switch fabric device 130 may be supported.

In operation 1070, each of the second input module 112 receiving the second scheduling acknowledgment signal verifies a timeslot allocated to the second input module 112 from the second scheduling acknowledgement signal and, when the timeslot counter corresponds to the verified timeslot, transmits a photonic frame generated by the second input module 112 to the photonic switch fabric device 130 through an input port in the photonic switch fabric device 130 corresponding to the second input module 112 during the timeslot being maintained.

When destinations of photonic frames transmitted from the input modules 110 are different, the photonic switch fabric device 130 may change a wavelength based on a timeslot allocated to each of the input modules 110 and switch the photonic frames to be transmitted to an outputter through different output ports of the photonic switch fabric device 130 during a switching transmission time for which the timeslot is allocated.

That is, the photonic switch fabric device 130 may transmit the photonic frames at various wavelengths at a same time through a frequency division performed on the switching transmission time classified by the timeslot based on a destination, or an output port, for which a packet heads again.

According to an example embodiment, as described above, through an exchange of scheduling information between a main controller and a plurality of input modules, a packet to be input through the input modules may be effectively switched and transmitted based on the scheduling information.

Figure 11:
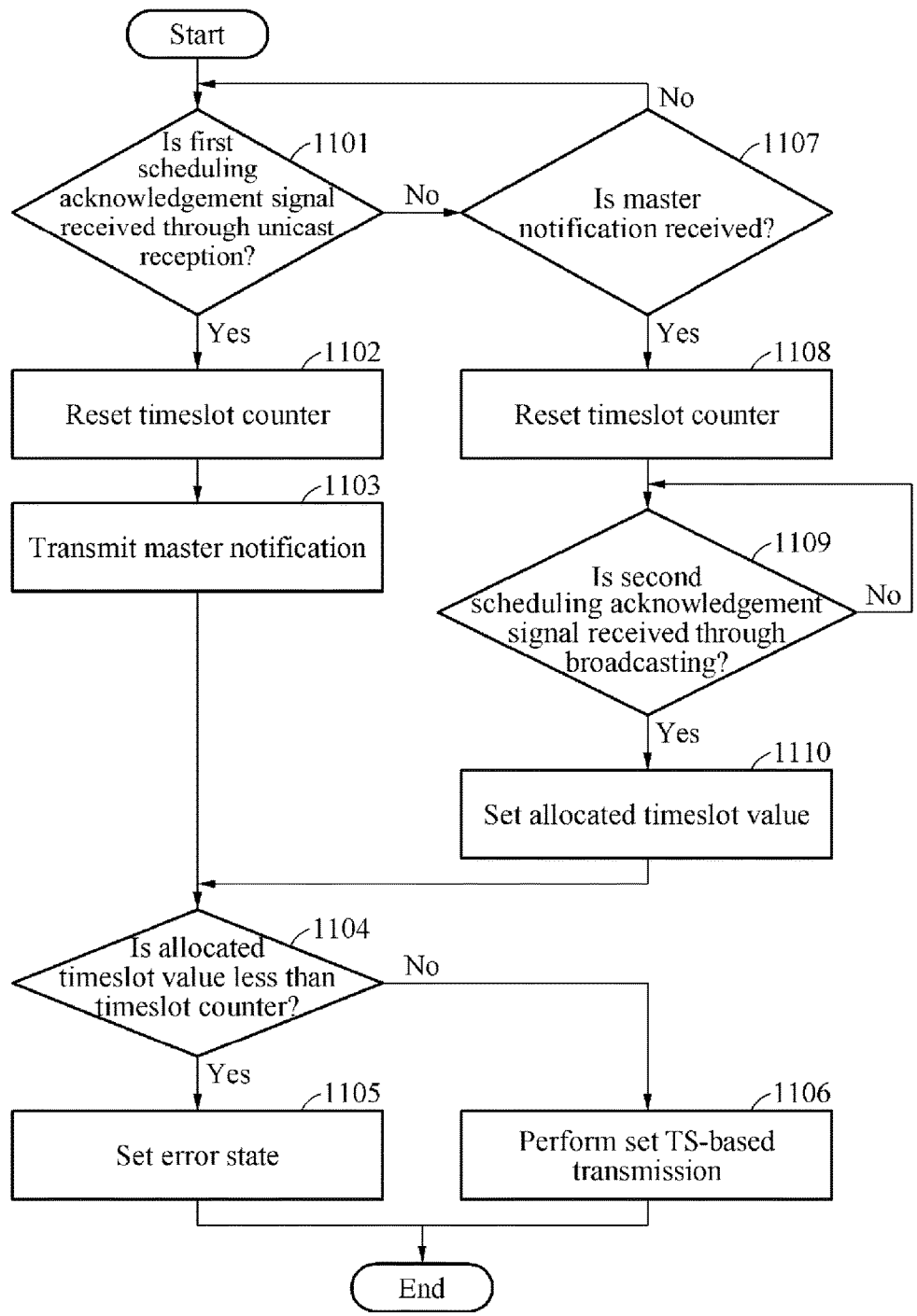
FIG. 11 is a flowchart illustrating a method of synchronizing scheduling information in response to reception of a scheduling acknowledgement signal by a plurality of input modules from a main controller according to an example embodiment.

FIG. 11 is a flowchart illustrating a method of synchronizing scheduling information in response to reception of a scheduling acknowledgement signal by a plurality of input modules from a main controller according to an example embodiment.

A photonic frame switching method according to an example embodiment may be performed by the photonic frame switching system 100 described with reference to FIG. 1.

Referring to FIG. 11, in operation 1101, a first input module, for example, the first input module 111 of FIG. 1, determines whether a first scheduling acknowledgement signal is received from a main controller, for example, the main controller 120 of FIG. 1, through unicast reception.

In operations 1102 and 1103, when the first scheduling acknowledgement signal is received through unicast reception as a result of the determining performed in operation 1101, the first input module 111 resets a timeslot counter, and notifies a second input module, for example, the second input module 112 of FIG. 1, that the first input module 111 is a master input module to guide the second input module 112 to reset a timeslot counter.

In operation 1104, the first input module 111 verifies a timeslot value allocated to the first input module 111 from the first scheduling acknowledgement signal, and compares the verified timeslot value to the timeslot counter.

In operation 1105, when the timeslot value is verified to be less than the timeslot counter as a result of the comparing performed in operation 1104, the first input module 111 determines that a timeslot allocated to the first input module 111 already passes and sets an error state for a corresponding packet.

The first input module 111 may then generate a scheduling request again with respect to the packet for which the error state is set.

In operation 1106, when the timeslot value is verified to be greater than or equal to the timeslot counter as the result of the comparing performed in operation 1104, the first input module 111 performs a set TS-based photonic frame transmission operation.

That is, the first input module 111 may wait to transmit a photonic frame generated by the first input module 111 when the timeslot value is greater than the reset timeslot counter, and then transmit the photonic frame to the photonic switch fabric device 130 through an input port in the photonic switch fabric device 130 corresponding to the first input module 111 when the timeslot value corresponds to an increased timeslot counter.

Alternatively, when the first scheduling acknowledgement signal is not received through unicast reception as the result of the determining performed in operation 1101, the second input module 112 may determine whether the master notification is received from the first input module 111 receiving the first scheduling acknowledgement signal.

When the master notification is not received, the second input module 112 may return to operation 1101. When the master notification is received, the second input module 112 resets the timeslot counter in operation 1108.

In operation 1109, the second input module 112 determines whether a second scheduling acknowledgement signal is received from the main controller 120 through broadcasting.

The second module 112 may wait to receive the second scheduling acknowledgment signal through broadcasting by repeating operation 1109 when the second scheduling acknowledgement signal is not received through broadcasting. In operation 1110, when the second scheduling acknowledgement signal is received through broadcasting, the second input module 112 sets, to be a newly scheduled timeslot value, a timeslot that is included in the second scheduling acknowledgement signal and allocated to the second input module 112.

The second input module 112 then returns to operation 1104, and compares the timeslot value allocated to the second input module 112 to a current timeslot counter.

In operation 1105, when the timeslot value is less than the current timeslot counter as a result of the comparing performed in operation 1104, the second input module 112 determines that a timeslot allocated to the second input module 112 passes already and sets an error state for a corresponding packet.

Alternatively, in operation 1105, when the timeslot value is greater than or equal to the timeslot counter as the result of the comparing performed in operation 1104, the second input module 112 performs a set TS-based photonic frame transmission operation.

That is, the second input module 112 may wait to transmit a photonic frame generated by the second input module 112 when the timeslot value is greater than the current timeslot counter, and then transmit the photonic frame to the photonic switch fabric device 130 through an input port in the photonic switch fabric device 130 corresponding to the second input module 112 when the timeslot value corresponds to an increased timeslot counter.

According to example embodiments, when encapsulating, in a photonic frame, a packet input to each of a plurality of input modules and performing switching on the photonic frame through an exchange of scheduling information between a main controller and the input modules, scheduled timeslots may be synchronized using timing information, for example, a timeslot counter, that is mutually used in the input modules.

According to example embodiments, through an exchange of scheduling information between a main controller and a plurality of input modules, a packet to be input through the input modules may be effectively switched and transmitted based on the scheduling information.

According to example embodiments, a collision at an output port that may occur due to asynchronous scheduling information among a plurality of input modules may be reduced, and also an additional memory to be used to reduce such a collision may not be needed and efficiency of use of a memory may be improved.

According to example embodiments, when a packet to be externally output from a data center is input through a plurality of input modules, by encapsulating each packet into a subframe and generating a photonic frame in an aggregated form of subframes, transmission efficiency may be improved and also a high-throughput switching process may be supported.

The components described in the exemplary embodiments of the present disclosure may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present disclosure may be achieved by software, and the software may be recorded on a recording medium. The components, the functions, and the processes described in the exemplary embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A photonic frame switching method, comprising:
    transmitting a scheduling request from each of a plurality of input modules to a main controller;
    in response to reception of a first scheduling acknowledgement signal transmitted from the main controller to a first input module among the input modules through unicast transmission, transmitting a master notification from the first input module to a second input module, which is a remaining input module of the input modules excluding the first input module;
    resetting, by the second input module receiving the master notification, a second timeslot counter used in the second input module to be synchronized with a first timeslot counter used in the first input module; and
    transmitting a photonic frame from each of the input modules to a photonic switch fabric device according to a timeslot allocated to each of the input modules based on a scheduling acknowledgement signal transmitted from the main controller, based on the synchronized first and second timeslot counters.

2. The photonic frame switching method of claim 1, wherein the transmitting of the master notification comprises:
    transmitting the master notification to the second input module within a time interval set based on a point in time at which the first scheduling acknowledgement signal is transmitted from the main controller, to synchronize the first timeslot counter and the second timeslot counter before a second scheduling acknowledgement signal is transmitted from the main controller to the second input module through broadcasting.

3. The photonic frame switching method of claim 1, wherein the transmitting of the photonic frame to the photonic switch fabric device comprises:
    verifying, by the first input module, a timeslot allocated to the first input module from the first scheduling acknowledgement signal; and
    in response to the first timeslot counter corresponding to the verified timeslot, during the timeslot being maintained, transmitting, from the first input module, a photonic frame generated in the first input module to the photonic switch fabric device through an input port in the photonic switch fabric device corresponding to the first input module.

4. The photonic frame switching method of claim 1, wherein the transmitting of the photonic frame to the photonic switch fabric device comprises:
    verifying, by the second input module, a timeslot allocated to the second input module from a second scheduling acknowledgement signal; and
    in response to the second timeslot counter synchronized with the first timeslot counter corresponding to the verified timeslot, during the timeslot being maintained, transmitting, from the second input module, a photonic frame generated in the second input module to the photonic switch fabric device through an input port in the photonic switch fabric device corresponding to the second input module.

5. The photonic frame switching method of claim 1, further comprising:
    transmitting a scheduling request generated in response to an input of a packet from each of the input modules to the main controller at a synchronized scheduled time; and
    in response to scheduling requests received sequentially from the input modules, performing scheduling by the main controller during a predefined minimum scheduling time.

6. The photonic frame switching method of claim 5, wherein the performing of the scheduling comprises:
    performing the scheduling in response to reception of a number of scheduling requests greater than or equal to a preset number from the input modules; or
    performing the scheduling in response to reception of scheduling requests during a preset time from a point in time at which a scheduling request was initially received.

7. The photonic frame switching method of claim 5, wherein the transmitting of the scheduling request to the main controller comprises:
    in response to a number of input packets being greater than or equal to a threshold value, transmitting the scheduling request through an input and output port included in each of the input modules,
    wherein the input and output port is configured to receive the first scheduling acknowledgement signal or a second scheduling acknowledgement signal from the main controller as a response to the scheduling request.

8. The photonic frame switching method of claim 1, further comprising:
    after a predefined minimum scheduling time elapses, transmitting the first scheduling acknowledgement signal from the main controller to the first input module through unicast transmission based on a result of performing scheduling in response to the scheduling request; and
    transmitting a second scheduling acknowledgment signal from the main controller to the second input module through broadcasting at a preset time interval from a point in time at which the first scheduling acknowledgement signal is transmitted.

9. The photonic frame switching method of claim 8, further comprising:
    generating, by each of the input modules, a photonic frame using an input packet; and
    transmitting the photonic frame from each of the input modules to the photonic switch fabric device in response to reception of the first scheduling acknowledgement signal or the second scheduling acknowledgement signal.

10. The photonic frame switching method of claim 9, wherein the generating of the photonic frame comprises:
    generating the photonic frame including at least one of at least one subframe including a packet input to a corresponding input module, an identification value of the subframe, and a minimum distance between subframes.

11. The photonic frame switching method of claim 10, wherein the generating of the photonic frame further comprises:

generating the photonic frame by changing a start frame delimiter (SFD) field in an Ethernet frame to a header including the identification value of the subframe, and adding an interframe gap (IFG) field including the minimum distance between subframes, following a frame check sequence (FCS) field in the Ethernet frame.

12. The photonic frame switching method of claim 1, further comprising:

in response to different destinations of respective photonic frames transmitted from the input modules, changing, by the photonic switch fabric device, a wavelength based on the timeslot allocated to each of the input modules and performing switching on the photonic frames to be transmitted to an outputter through different output ports of the photonic switch fabric device.

13. A photonic frame switching method, comprising:

in response to an input of at least one packet, transmitting a scheduling request from an input module to a main controller;

in response to reception of a scheduling acknowledgement signal transmitted from the main controller as a response to the scheduling request, transmitting a master notification to another input module;

in response to reception of the master notification by the other input module occurring before reception of the scheduling acknowledgement signal, resetting a timeslot counter to synchronize the reset timeslot counter with a timeslot counter used in the input module from which the master notification is transmitted;

verifying a timeslot allocated to the input module from the scheduling acknowledgement signal received from the main controller; and transmitting a photonic frame generated using the at least one packet to a photonic switch fabric device during the verified timeslot corresponding to the timeslot counter synchronized with the timeslot counter used in the other input module.

14. A photonic frame switching system, comprising:

a main controller; and a plurality of input modules each configured to transmit a scheduling request to the main controller;

wherein, in response to reception of a first scheduling acknowledgement signal transmitted from the main controller through unicast transmission, a first input module among the input modules is configured to transmit a master notification to a second input module, which is a remaining input module of the input modules excluding the first input module, the second input module receiving the master notification is configured to reset a second timeslot counter used in the second input module to synchronize the reset second timeslot counter with a first timeslot counter used in the first input module, and each of the input modules is configured to transmit a photonic frame to a photonic switch fabric device according to a timeslot allocated to each of the input modules based on a scheduling acknowledgement signal transmitted from the main controller, based on the synchronized first and second timeslot counters.

15. The photonic frame switching system of claim 14, wherein the first input module is configured to transmit the master notification to the second input module within a time interval set based on a point in time at which the first scheduling acknowledgement signal is transmitted from the main controller, and allow the first and second timeslot counters to be synchronized with each other before a second scheduling acknowledgement signal is transmitted from the main controller to the second input module through broadcasting.

16. The photonic frame switching system of claim 14, wherein the first input module is configured to verify a timeslot allocated to the first input module from the first scheduling acknowledgement signal, and in response to the first timeslot counter corresponding to the verified timeslot, transmit a generated photonic frame to the photonic switch fabric device through an input port in the photonic switch fabric device corresponding to the first input module, during the timeslot being maintained.

17. The photonic frame switching system of claim 14, wherein the second input module is configured to verify a timeslot allocated to the second input module from a second scheduling acknowledgement signal, and in response to the second timeslot counter synchronized with the first timeslot counter corresponding to the verified timeslot, transmit a generated photonic frame to the photonic switch fabric device through an input port in the photonic switch fabric device corresponding to the second input module, during the timeslot being maintained.

18. The photonic frame switching system of claim 14, wherein the main controller is configured to, after a predefined minimum scheduling time elapses, transmit the first scheduling acknowledgement signal to the first input module through unicast transmission based on a result of performing scheduling in response to the scheduling request, and transmit a second scheduling acknowledgement signal to the second input module through broadcasting at a set time interval from a point in time at which the first scheduling acknowledgement signal is transmitted.

19. The photonic frame switching system of claim 18, wherein each of the input modules is configured to generate a photonic frame using an input packet, and in response to reception of the first scheduling acknowledgement signal or the second scheduling acknowledgement signal, transmit the photonic frame to the photonic switch fabric device.

20. The photonic frame switching system of claim 14, wherein, in response to different destinations of respective photonic frames transmitted from the input modules, the photonic switch fabric device is configured to change a wavelength based on the timeslot allocated to each of the input modules and perform switching on the photonic frames to be transmitted to an outputter through different output ports of the photonic switch fabric device.

* * * * *